United States Patent [19]

Drapac et al.

[11] Patent Number: 4,928,086

[45] Date of Patent: May 22, 1990

[54] PAGER RECEIVER HAVING A COMMON TIMER CIRCUIT FOR BOTH SEQUENTIAL LOCK-OUT AND OUT-OF-RANGE

[75] Inventors: George Drapac, Boca Raton; Walter J. Grandfield, Lake Worth, both of Fla.

[73] Assignee: Motorola, Inc., Schaumburg, Ill.

[21] Appl. No.: 302,876

[22] Filed: Jan. 30, 1989

[51] Int. Cl.⁵ .......................... H04Q 7/02; H04B 7/00
[52] U.S. Cl. .................. 340/825.440; 340/825.520; 455/58
[58] Field of Search ...................... 340/825.44, 825.48, 340/825.49, 311.1, 314, 825.52; 455/33, 58

[56] References Cited

U.S. PATENT DOCUMENTS

| | | | |
|---|---|---|---|
| 4,663,623 | 5/1987 | Lax et al. | 340/825.44 |
| 4,682,165 | 7/1987 | Danis | 340/825.44 |
| 4,837,854 | 6/1989 | Oyagi et al. | 340/825.44 |
| 4,839,628 | 6/1989 | Davis et al. | 340/825.44 |

*Primary Examiner*—Donald J. Yusko
*Assistant Examiner*—Peter S. Weissman
*Attorney, Agent, or Firm*—William E. Zitelli; Vincent B. Ingrassia

[57] ABSTRACT

A pager receiver includes at least one lock-out circuit, an out-of range circuit, and a single timer coupled to the lock-out and out-of range circuits and responsive to timing signals generated by the pager for generating an initiated one of either the lock-out timer interval or out-of range time interval. Each lock-out circuit of the pager receiver corresponds to an address function programmed therein and is activated by the function detect signal generated in response to the initial decoding of the corresponding address function to initiate the generation of the lock-out time interval by the single timer and to inhibit the corresponding alert annunciation from responding to subsequently generated function detect signals corresponding thereto for the duration of the lock-out time interval. The single timer is also initiated to generate the out-of-range time interval at the generation of each sync pulse timing signal by the pager receiver, but only in the absence of an activated lock-out circuit. Accordingly, the single timer is disabled from initiating the generation of the out-of-range time interval for the duration of an initiated lock-out time interval. Still further, the single timer may be reinitiated to generate the lock-out time interval during the generation of a lock-out time interval by an activated lock-out circuit corresponding to an uninhibited alert annunciation.

8 Claims, 4 Drawing Sheets

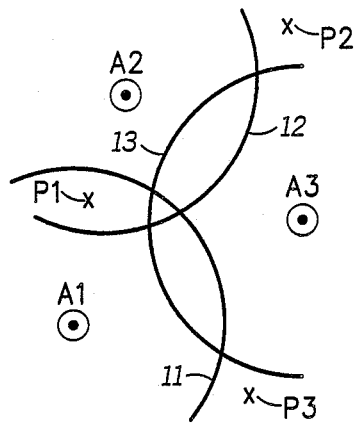
FIG.1
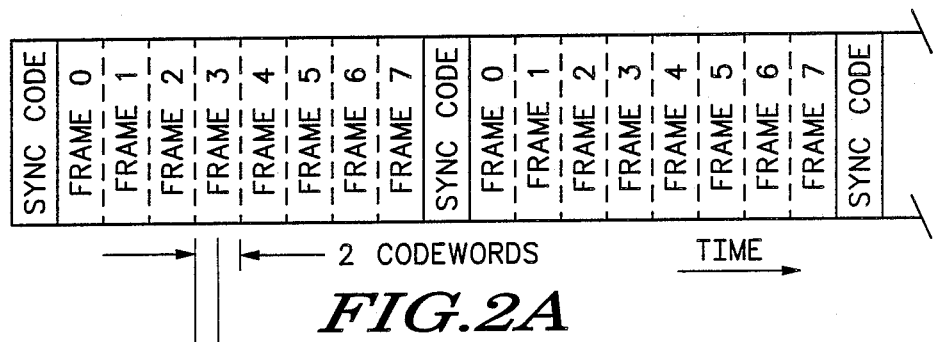
FIG.2A
FIG.2B
UNIQUE ADDRESS SIGNALLING
CODES FOR POCSAG
| FUNCTION BITS | FUNCTION |
|---|---|
| 00 | ALERT FUNCTION F1 |
| 01 | ALERT FUNCTION F2 |
| 10 | ALERT FUNCTION F3 |
| 11 | ALERT FUNCTION F4 |
FIG.3

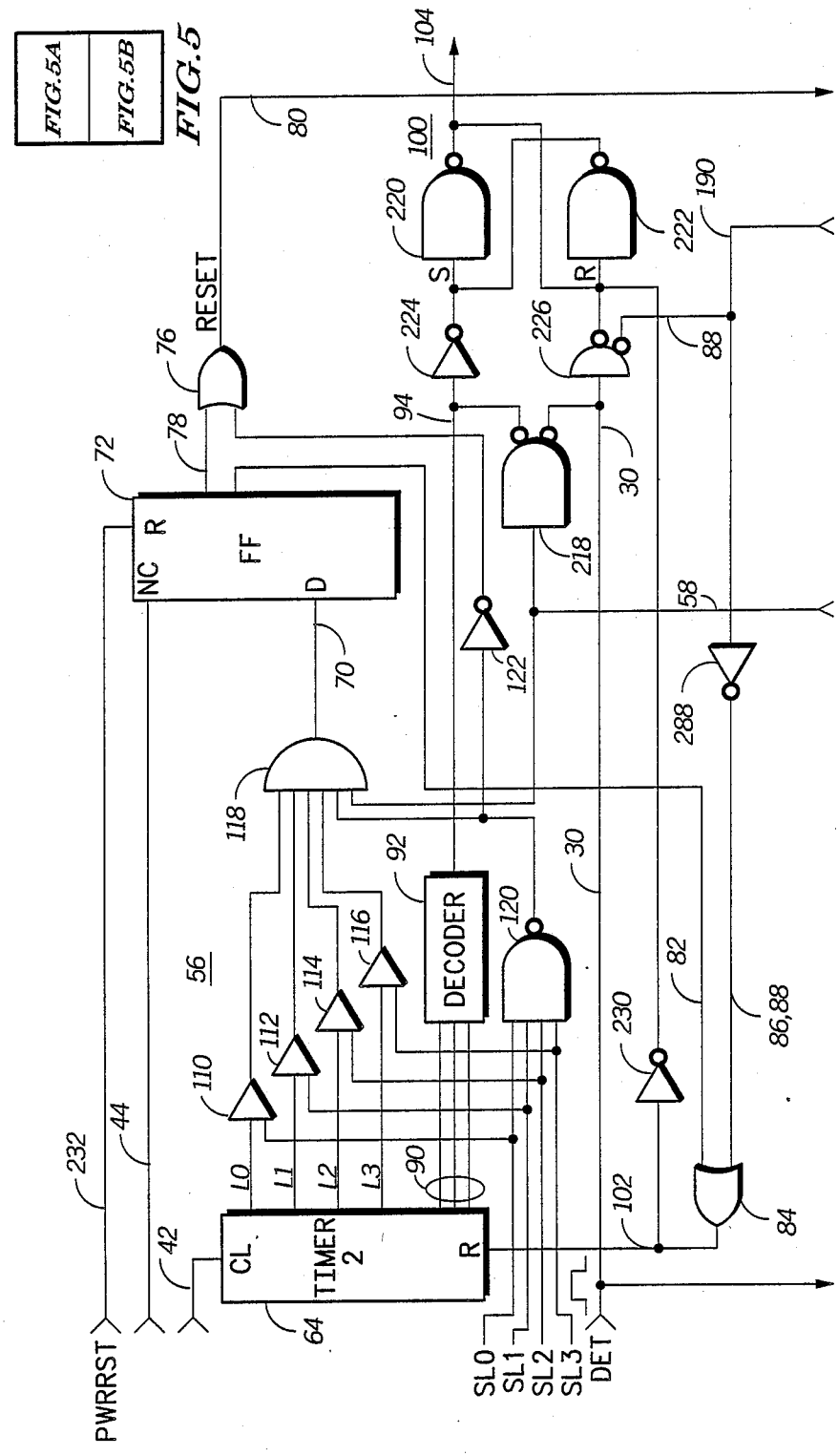

_PAGER RECEIVER HAVING A COMMON TIMER CIRCUIT FOR BOTH SEQUENTIAL LOCK-OUT AND OUT-OF-RANGE_

BACKGROUND OF THE INVENTION

The present invention is related to pager receivers, in general, and more particularly, to a pager receiver having a sequential lock-out circuit, an out-of-range circuit, and a common timer circuit for selectively generating the timing periods therefor.

For a paging system which has users spread over a very large geographical region, a radio frequency (RF) transmission system must be devised with a radiation pattern which blankets the entire region in order to reach each of the users. It is well recognized that the use of one large transmitter centrally located within the region would be at best considered cost prohibitive. Accordingly, paging systems have adopted the use of several smaller transmitters strategically located within the geographical region to offer individual radiation patterns which cover the region. Such a system is illustrated in the sketch of FIG. 1 wherein three transmission antennas designated as A1, A2, and A3 are disposed strategically to cover all of the pager users within a given area.

Normally, the different transmitters A1, A2, and A3, for example, transmit the same queue of pages sequentially over mutually exclusive periods of time. Because of the circular or omnidirectional radiation transmitting pattern of the antenna transmitters A1, A2, and A3 as shown by the boundary lines 11, 12, and 13, overlapping transmission areas of radiation are created. A pager receiver such as that shown by the "X" at P1 located in an overlapped area will receive a page transmission first from transmitter A1 and then the same page transmission from transmitter A2 sequentially thereafter. This duplication of page transmissions will cause the same alert annunciation to occur at different times in the pager P1.

In order to deal with this problem of unwanted duplicate alerts, some pagers have been designed with sequential lock-out circuits which inhibit the alert annunciation of repeat address function detects for a period of time that is commensurate with the maximum transmitted queue of a transmitter. A lock-out circuit may be included for each address function programmed into a pager such that each may be locked out independently of the other different address functions.

In addition, once the pager user moves to a location out of the composite radiation pattern, such as those locations shown at P2 and P3 in the illustration of FIG. 1, an out-of-range circuit disposed in the pager detects that it has not received a transmission over a predetermined period of time and, as a result, initiates an alert annunciation corresponding to an out-of-range situation. Of course, once the pager user moves to a location within a radiation pattern of one of the several antennas of the paging system, the out-of-range circuit is reset by the first received transmission and the annunciation corresponding thereto may be removed upon subsequent interrogation of the pager unit.

It is clear from the preceding description that, for each of the aforementioned circuits, some electronic timing mechanism is needed to establish the periods of time associated therewith. In most modern pager designs, timer circuits are usually comprised of a chain of digital divider networks which divide a reference oscillator frequency which may be on the order of 100 KHz or more down to periods of time associated with seconds and minutes. Moreover, circuit for establishing a time period is apparently needed for each address function detect which requires sequential lock-out and for the out-of-range detect circuit.

Not only does it become expensive in the number of circuit elements needed to implement the various individual timer circuits, but the duplication of timer circuits also requires a large area of real estate on an integrated circuit or on a printed circuit board, as the case may be. Power consumption is also a problem for energizing each of the individual timing generators with their long chains of flip-flop circuits, especially with regard to portable pagers that have an operational life which is heavily dependent on the power drain on the battery. To complicate matters further, custom decoding circuits are needed for each timer chain to identify the duration of the corresponding periods of time. Accordingly, because of the greater and greater emphasis on battery saving techniques and on designing pager electronics into a smaller profile, it is becoming of paramount importance to improve the aforementioned timer circuit designs of the pager and bring them in line with these power conservation and miniaturization trends. These objectives, as well as cost reduction, are the focus of the present invention which will be more fully understood from the following description of the preferred embodiment and drawings associated therewith.

SUMMARY OF THE INVENTION

In a pager receiver, a receiver receives transmitted RF signals and converts them to receive signals which are decoded by a decoder in accordance with a coded paging system format to detect sync words and address function data included within the coded paging system format. The decoder generates sync pulse timing signals in response to decoded sync words and generates a function detect signal in response to a corresponding decoded address function. The pager receiver further includes means governed by the function detect signal to cause an alert annunciation corresponding thereto, and a source of timing signals.

In accordance with the present invention, the pager receiver comprises: means for inhibiting an alert annunciation in response to a repeat decoding of a corresponding address function within a first selected time interval of an initial decoding thereof; means for detecting a lack of decoded sync words over a second selected time interval and for causing an out-of-range annunciation in response to the detection; and single timer means coupled to both of the inhibiting means and the detecting means and responsive to the timing signals for generating an initiated one of either the first or second selected time intervals.

In accordance with another aspect of the present invention, the inhibiting means includes lock-out means corresponding to each address function of the pager receiver. Each lock-out means is activated by the function detect signal generated in response to the initial decoding of the corresponding address function to initiate the generation of the first selected time interval by the single timer means and to inhibit an alert annunciation in response to subsequently generated corresponding function detect signals for the duration of the first selected time interval generated by the single timer means. In addition, the single timer means is initiated by the detecting means at each sync pulse timing signal to generate the second selected time interval which is substantially longer in time than the time interval between any two successive sync pulse timing signals. A set signal is generated by the detecting means at the term of the second selected time interval as generated by the single timer means for causing the out-of-range annunciation. Accordingly, no set signal is generated as long as sync pulse timing signals are generated. Still further, the inhibiting means disables the detecting means from initiating the generation of the second selected time interval by the single timer means in response to sync pulse timing signals for the duration of an initiated first selected time interval.

In accordance with a further aspect of the present invention, the inhibiting means includes a plurality of lock-out means respectively corresponding to the plurality of address functions programmed into the pager receiver. Each lock-out means is activated by the initial function detect signal corresponding thereto. The single timer means is reinitiated during the generation of the first selected time interval by an activated lock-out means corresponding to an uninhibited alert annunciation. Still further, the single timer means is initiated to generate the second selected time interval by a sync pulse timing signal in the absence of an activated lock-out means. Still further, a second decoder means included in the pager receiver is responsive to a selected special digitally coded word to disable the inhibiting means from inhibiting an alert annunciation.

BRIEF DESCRIPTION OF THE DRAWINGS

FIG. 1 is a plan view sketch illustrating the radiation patterns of several sequentially operated transmitters of a paging system disposed strategically within a geographical region to cover all of the pager users therein.

FIGS. 2A and 2B are illustrations of a coded paging system format suitable for use by a pager receiver embodying the principles of the present invention.

FIG. 3 is a table which illustrates the decoding of address function bits of a coded paging system format to provide corresponding function detect signals suitable for use by an embodiment of the present invention.

FIG. 5, including FIGS. 5A and 5B, is a functional logic schematic diagram depicting a combination of the functions of lock-out, out-of-range, and a common timer for selectively generating the associated time periods therefor suitable for embodying the present invention.

DESCRIPTION OF THE PREFERRED EMBODIMENT

As described in the background section above, FIG. 1 illustrates a paging network employing a plurality of transmitters designated at A1, A2, and A3, for example, having overlapping radiation pattern boundaries depicted by the lines 11, 12, and 13 to cover a large geographical region. The transmitters A1, A2, and A3 each transmits sequentially the same queue of page transmissions over mutually exclusive periods of time. Accordingly, a pager located in an overlapping area of radiation patterns such as that shown at P1 may first receive a page transmission from the transmitter A1 and subsequently receive a page transmission from transmitter A2. Of course, pager receivers located beyond the boundaries of the radiation patterns of the several transmitters of a paging network, such as those pagers located at P2 and P3, for example, will be unable to receive transmissions from the paging network and will thus be considered out-of-range of the paging network.

It is well known that paging networks transmit over the air an RF carrier signal modulated with a coded paging system format such as the Golay Sequential Code or the POCSAG code, for example. The present embodiment will be described in connection with the POCSAG code, but it is well understood that other paging codes may be used without deviating from the principles of the present invention. The POCSAG code will be described in connection with FIGS. 2A, 2B, and 3.

Referring to FIG. 2A, a batch transmission of the POCSAG code commences with a sync code comprising a predetermined number of bits and sequentially thereafter includes eight frames, each containing two code words of 32 bits each. The batch transmission format is repeated as many times as needed to fulfill the queue of page transmissions at each transmitter in the paging system.

Each code word of the POCSAG coding system includes 32 bits of information as depicted in FIG. 2B. The first bit indicates whether the code word is an address word or a message word. The next 18 bits provide a unique address for an individual pager. The next two bits, 20 and 21, provide a code for one of a possible four address functions which, when decoded, will command a corresponding alert annunciation at the addressed pager. FIG. 3 is a table which illustrates the decoding of the function bits 20 and 21 to provide the corresponding address function detect signals F1–F4 which will be discussed in greater detail herein below. The remaining bits 22-32 of the POCSAG code word provide for error detection and correction parity and check bits which are well known to those skilled in the pertinent art and not considered to be part of the present invention other than for the purpose of detecting and correcting errors in the address and function bits of the code word.

Figure 4:
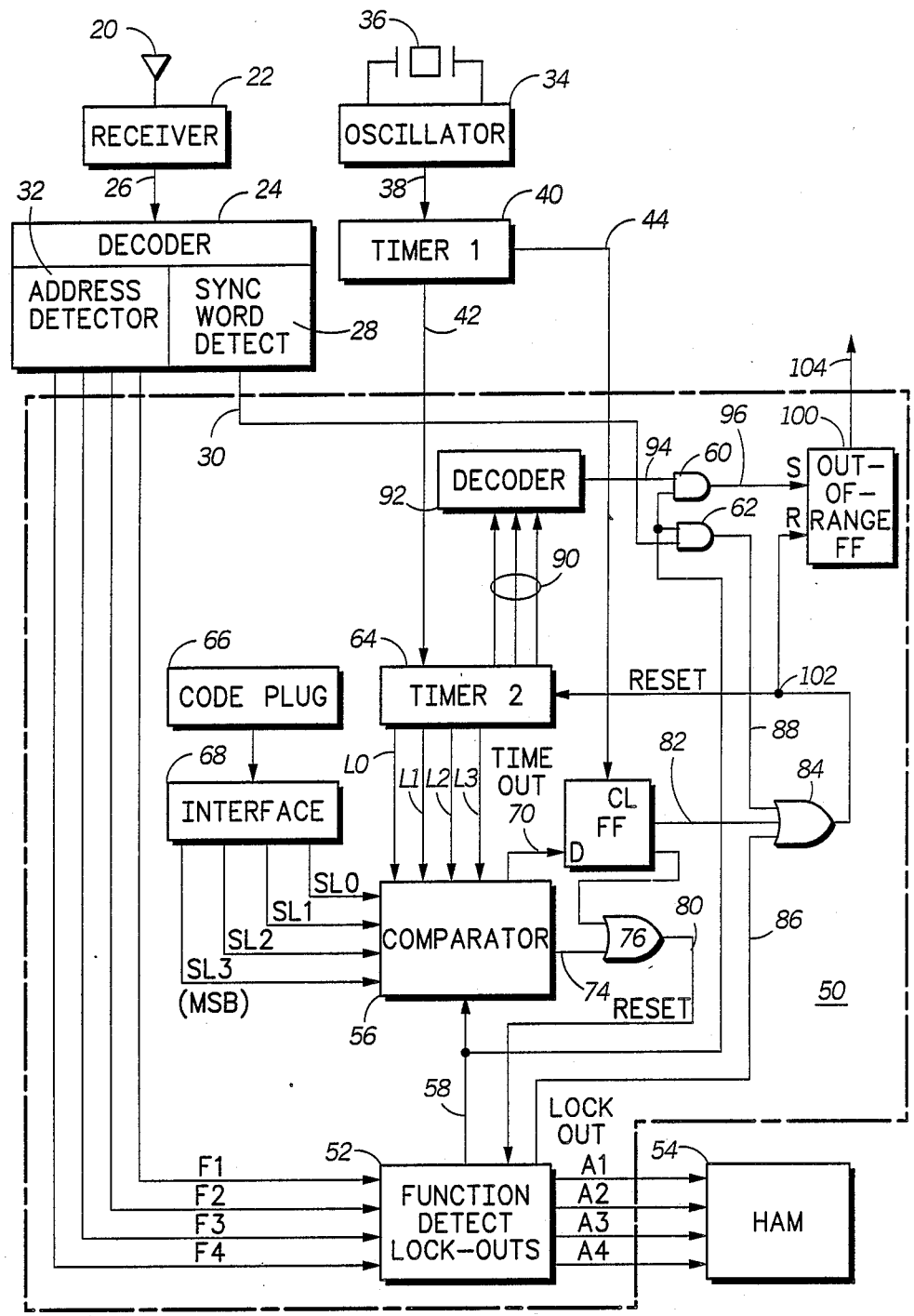
FIG. 4 depicts a block diagram schematic of a pager receiver suitable for embodying the principles of the present invention.

Referring to FIG. 4, a typical pager receiver receives transmitted RF signals through a conventional antenna 20 and converts the received RF signals to lower frequency or baseband signals for use within the pager receiver utilizing a conventional receiver unit 22. The converted signals are provided to a decoder unit 24 over signal line 26 wherein they are decoded in accordance with a coded paging system format, such as the POCSAG format, for example, to detect sync words, the unique address of the individual pager and address functions associated therewith such as that described in connection with FIGS. 2A, 2B, and 3. The sync words of each batch of page transmissions are detected by a conventional sync word detect circuit 28 which generates a sync pulse timing signal over signal line 30 for each sync word decoded from the received signals 26. A conventional address detector circuit 32 is also included in the decoder 24 for performing a selective call detect function, for example, and for decoding the function bits of the pager address to identify which alert is to be annunciated by the pager and generating a signal over one of the signal lines F1 through F4 corresponding thereto.

The pager receiver also includes an oscillator circuit 4 which may be of a conventional crystal controlled variety including a crystal 36. In the present embodiment, the oscillator 34 generates a source of timing signals at a frequency of approximately 76.8 KHz over signal line 38 to a first timer circuit 40. The first timer circuit 40 may be comprised of a digital divider network including a chain of flip-flop circuits which operate to divide down the oscillator timing signal to a signal having a frequency on the order of 60 Hz which is supplied over signal line 42. In the flip-flop chain, another timing signal having a frequency on the order of 1 KHz may be generated and supplied over a signal line 44.

In accordance with the broad principles of the present invention, the pager receiver may further include address, function detect lock-out circuits, an out-of-range circuit, and a common timer circuit for selectively generating the associated time periods therefor. The combination of the aforementioned circuits is shown within the dot-dashed block 50 of FIG. 4. In connection with the combination of circuits 50, the signal lines F1–F4 are provided as inputs to a respective plurality of function detect lock-out circuits, depicted by a function block 52, which generate correspondingly alert signals A1–A4 which are provided to a hierarchal alert machine (HAM) shown by the block 54 which is disposed outside of the combination of circuits 50. The HAM circuit 54 is found in most modern pager receivers for providing preprogrammed annunciation patterns respectively corresponding to the governing alert signals A1–A4 to provide distinctive audio, visual or tactile manifestations to the user. HAM circuits of this type may be found in such pager receivers as the "ENVOY" Series Pagers (Model #A01FAC4568AA) and "BPR 2000" Series Pagers (Model #A01BGB1568B), both manufactured by Motorola, Inc..

The lock-out circuits 52 are coupled to a conventional digital comparator circuit 56 by a signal line 58 which is also coupled to one input of two AND gate functions 60 and 62. The timing signal line 42 is coupled to an input of a second timer circuit 64 which may be comprised of a conventional chain of flip-flop circuits utilized to divide down binarily the timing signal of line 42. Selected outputs from certain of the timing flip-flop circuits are provided over signal lines L0–L3 to respective inputs of the comparator circuit 56. A code plug memory 66 of the pager receiver may have programmed therein a digital code designated by the signals SL0, SL1, SL2, and SL3 representative of a first period of time. Such signals may be interfaced to still other inputs of the comparator circuit 56 through a conventional code plug interface circuit 68 and signal lines denoting the signals SL0–SL3 corresponding to the signals which are carried thereby.

One output line 70 of the comparator 56 is coupled to the "D" input of a flip-flop circuit 72, and the clock "CL" input thereof is coupled to the signal line 44. Another output signal line 74 of the comparator circuit 56 is coupled to one input of an OR gate function 76. One output signal line 78 of the flip-flop 72 is coupled to another input of the OR gate function 76 which has an output line 80 coupled to another input of the lock-out circuits 52. Another output line 82 of the flip-flop circuit 72 is coupled to one input of another OR gate function 84. Another input of function 84 is coupled to another output line 86 of the lock-out circuits 52. The signal line 30 carrying the sync pulse timing signal is coupled to another input of the AND gate function 62 which has an output line 88 coupled to yet another input to the OR gate function 84. An output line 102 of the gate function 84 is coupled to both the reset input of an out-of-range circuit 100 and the reset input of the counter 64.

A set of output lines 90 are coupled respectively from selected flip-flop circuits of the timer circuit 64 to a conventional decoder circuit 92 which may be programmed internally with a digital code representing a second period of time. An output line 94 of the decoder 92 is coupled to the AND gate function 60 which has an output signal line 96 coupled to the set input of the out-of-range flip-flop circuit 100. An output signal line 104 of the circuit 100 may be coupled to an annunciation circuit (not shown) to cause an out-of-range annunciation to the user.

In a typical operation, the timer circuit 64 operates as a free-running digital counter governed by both the reference timing signal over signal line 42 which may be on the order of 60 Hz and the reset signal over the signal line 102. Accordingly, the timer 64 is counted up by the 60 Hz timing signal until it receives a reset signal. The reset signal resets the timer circuit 64 to a predetermined count which, for the present embodiment, is all zeroes. The outputs of four selected flip-flops denoted as L0, L1, L2, and L3 are selected to represent a binary code indicative of the duration of a first period of time. In the present embodiment, the least significant bit of the time duration code, represented by the signal L0, is indicative of a time interval duration of 34 seconds.

A first or lock-out time interval may be selected by programming a binary code representation thereof SL0–SL3 in the code plug memory 66. In the present embodiment, as the pager receiver is energized, the digital code SL0–SL3 representing the first time-out interval is sequentially transferred to an interface circuit 68, which may be a serial-to-parallel circuit, and then provided in parallel to the comparator 56 to be compared with the time duration code L0–L3 from the timer circuit 64.

In the event an address function is decoded by the decoder 24 as indicated by a signal appearing on one of the signal lines F1–F4, the corresponding function detect lockout circuit in block 52 generates a corresponding alert signal to cause an appropriate alert annunciation in accordance with the programmed pattern of the HAM circuit 54. Thereafter, such lock-out circuit 52 inhibits an alert annunciation in response to a repeat decoding of the corresponding address function within a first selected time interval of the initial decoding thereof which is accomplished as follows: The activated lock-out circuit 52 generates a lock-out signal over signal line 86 which causes the OR gate function 84 to generate a signal over line 102 to reset the timer 64 to zero. In response, the timer 64 initiates the generation of the lock-out time interval by counting up from zero to the first selected time interval binary code of SL0–SL3. Concurrently, the activated lock-out circuit 52 also generates a signal over signal line 58 to enable a comparison in the comparator circuit 56 between the binary codes of L0–L3 and SL0–SL3 in order to establish the term of the first time interval. In addition, a similar signal disables the AND gate functions 60 and 62 from passing their respective signals to the set and reset inputs of the out-of-range circuit 100 which in effect disables the out-of-range circuit 100 from causing an out-of-range annunciation. The pager receiver remains in the aforementioned lock-out state until the comparator 56 identifies term of the lock-out time interval by detecting equivalence in the binary codes L0–L3 and SL0–SL3 and generates a lock-out signal over signal line 70 in response thereto. The lock-out signal causes flip-flop circuit 72 to change the state of its outputs 78 and 82 as governed by the timing signal of signal line 44 which in turn resets the lock-out circuit 52 via OR gate function 76 and signal line 80 and resets the timer circuit 64 to zero via the OR gate function 84 and signal line 102, respectively. Upon being reset, the lock-out circuit 52 disables the comparator 56 and enables the AND gate functions 60 and 62 via signal line 58.

In this pager state, the alert annunciations are no longer inhibited and the timer circuit 64 is initiated to generate the second or out-of-range time interval. The term of the second term interval is detected by the decoder 92 using outputs of selected flip-flops of the timer circuit 64 represented by the signal lines 90. The decoder circuit 92 is programmed to generate a signal over line 94 to set the out-of-range circuit 100 via AND gate function 60 when the digital code of the signal lines 90 reaches the programmed digital code representative of the term of the out-of-range time interval. In the present embodiment, the timer circuit 64 is prevented from counting up to the digital code representing the term of the out-of-range time interval by the sync pulse timing signals over signal line 30 which periodically reset the timer circuit 64 to a zero count via the circuits 62, 84, and signal line 102.

For those pager receivers not requiring a lock-out function, a special binary code for the digital signals SL0-SL3 may be programmed into the code plug 66. In the preferred embodiment, this special code may be all zeroes or all ones as the case may be. The comparator circuit 56 includes a circuit for detecting the special code and generating a constant reset signal over signal line 74 which is conducted to the lock-out circuit 52 via OR gate function 76 and signal line 80. As long as the signal remains on the signal line 80, the lock-out circuits 52 are disabled from inhibiting an alert annunciation.

Figure 5B:
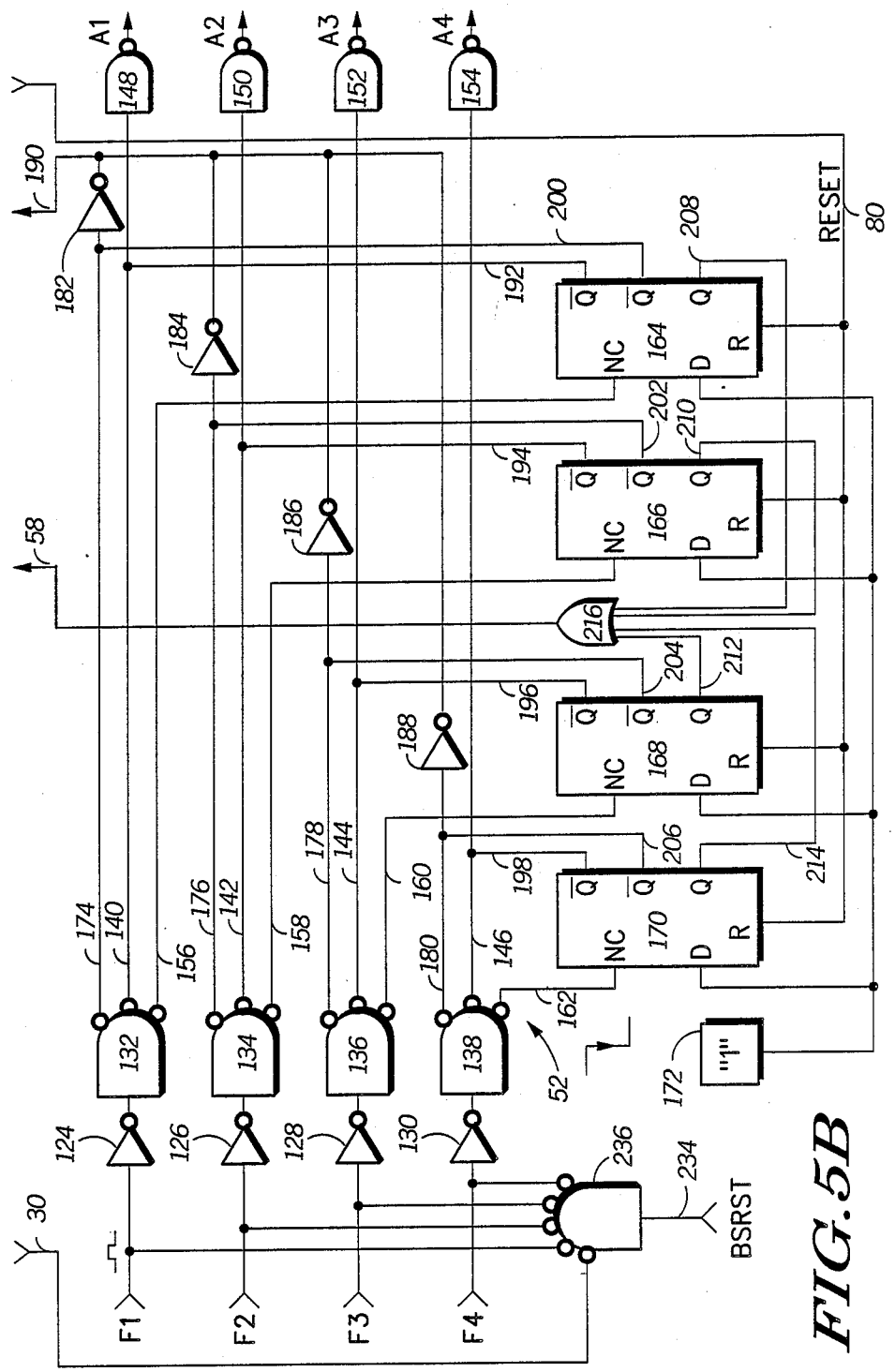

FIG. 5, including FIGS. 5A and 5B, depicts, a more detailed functional schematic representation of the circuit 50. Referring to FIG. 5, the comparator function 56 may be comprised of four individual comparator circuits 110, 112, 114, and 116 which may operate individually as exclusive NOR gates, for example. The signal lines of L0-L3 and SL0-SL3 are coupled respectively to the inputs of the individual comparator circuits 110-116 such that L0 is compared with SL0 in circuit 110 and so on. The outputs of the comparator circuits 110-116 are coupled to respective inputs of an AND gate function 118. The signal lines SL0-SL3 may also be coupled to a NAND gate function 120 having an output coupled to another input of the AND gate function 118 and to the input of OR gate function 76. The output of the AND gate 118 is the signal line 70 as described in connection with the embodiment of FIG. 4 which is connected to the "D" input of the flip-flop circuit 72.

The signal lines F1-F4 are coupled respectively through inverter gates 124, 126, 128, and 130 to corresponding inputs of NAND gate functions 132, 134, 136, and 138. One output 140, 142, 144, and 146 of each of the corresponding three output inverter gates 132, 134, 136, and 138 is coupled to an input of a corresponding inverter gate 148, 150, 152, and 154 which generates the alert signal A1, A2, A3, or A4. Another output 156, 158, 160, and 162 of the corresponding inverter gates 132, 134, 136, and 138 is coupled to a clock input denoted as "NC" of a corresponding flip-flop circuit 164, 166, 168, and 170. The "D" inputs of the flip-flop circuits 164, 166, 168, and 170 are tied together and coupled to a reference potential equivalent to a digital binary one ("1") level as denoted by the block 172. A third output of the inverter gates 132-138 designated by the respective signal lines 174, 176, 178, and 180 are coupled respectively to the input of inverter gates 182, 184, 186, and 188 having outputs which are tied together to form the signal line 190.

The signal lines 192, 194, 196, and 198 representing an output of each of the flip-flop circuits 164, 166, 168, and 170 are coupled respectively to the signal lines 140, 142, 144, and 146. The signal lines 200, 202, 204, and 206 each representing another output of the flip-flop circuits 164, 166, 168, and 170 are coupled respectively to the signal lines 174, 176, 178, and 180. The signal lines 208, 210, 212, and 214 representing yet another output of the flip-flop circuits 164, 166, 168, and 170, respectively, are coupled to the inputs of an OR gate 216 having an output signal carried over the signal line 58 to the inputs of the AND gate 118 and dual output inverter gate 218 which represents AND gate functions 60 and 62 described in connection with the embodiment of FIG. 4. One output of the dual output inverter gate function 218 is coupled to the out-of-range time-out signal line 94 and another output thereof is coupled to the sync pulse timing signal line 30.

In the present embodiment, the out-of-range flip-flop circuit 100 comprises the inverter gates 220 and 222 which are coupled together to form a conventional set-reset (RS) flip-flop. An inverter gate 224 is coupled between the signal line 94 and the set input of the RS flip-flop, and a dual output inverter gate 226 is coupled between the signal line 30 and the reset input thereof. Another output of the inverter gate 226 is coupled to the signal line 190 as an OR function configuration. The signal line 190 is coupled to the OR gate 84 through an inverter gate 228. The output signal line 102 of OR gate 84 is coupled to the reset input of timer 64. In addition, the signal line 102 is coupled to the reset input of the circuit 100 through an inverter gate 230.

Where possible in FIG. 5, the reference numerals of certain signal lines and circuit elements were maintained from FIG. 4 for consistency in describing the functions and circuit operations thereof. Two signals which are conventionally generated by a pager receiver, namely, power reset and battery saver reset, were not described in connection with the embodiment of FIG. 4 but are shown in the schematic of FIG. 5 by the signal lines 232 and 234, respectively. The signal line 232 is coupled to the reset input of the flip-flop circuit 72, and the signal line 234 is coupled to the input of a multi-output inverter gate function 236 which has its individual outputs coupled to the signal lines F1-F4 and 30.

The operation of the individual lock-out circuits comprising the flip-flops 164, 166, 168, and 170 is similar in each case and therefore, a description of operation of one should suffice for all of the others. Suppose, for example, an address function detect signal which may be a pulse on the order of 1 millisecond in duration occurs over the signal line F1, passes through the inverter gate 124 and effects a similar pulsed signal at the outputs of the inverter gate 132. The flip-flops 164-170 are designed to have the clock inputs "NC" thereat react to the falling edges of the pulsed signals coupled thereto. Thus, the state of the outputs of the flip-flop 164 will not be affected until the pulse over signal line 156 makes the transition from high to low. In an inactivated state, it is presumed that the output signals over signal lines 192 and 200 are at a high binary state and the signal over signal line 208 is at a low binary state, this being the non-lock-out status condition.

Accordingly, the pulsed signal over signal line 174 passes through the inverter gate 182, and inverter gate 228, and OR gate 84 to reset the timer circuit 64 to all zeroes which initiates the generation of the lock-out time interval thereby. In response, the timer circuit 64 begins counting up as governed by the timing signal 42 towards the binary code set by the coded word SL0-SL3. Concurrently therewith, the pulsed signal over signal line 140 is passed through the inverter gate 148 to cause the corresponding alert annunciation in the pattern programmed for the decoded address function of F1.

When the pulsed signal over signal line 56 makes the transition from high to low, the flip-flop 164 causes its outputs to change state in which case the signals over lines 192 and 200 become a binary low and the signal over line 208 becomes a binary high. The low signal over signal lines 192 and 200 holds low the signal lines 140 and 174, respectively, inhibiting the possibility of a repeat alert annunciation for the corresponding address function detect and the possibility of a reset of the timer in response to the corresponding address function during the duration of the lock-out time interval. In addition, the binary high state of signal line 208 is passed through the OR gate 216 to the inverter gate 218 which effects binary low states at the outputs thereof to hold the signal lines 94 and 30 low, thus disabling the out-of-range flip-flop circuit 100 and inhibiting the sync pulse timing signals from resetting the timer circuit 64 which is intended to initiate the out-of-range time interval generation. The lockout signal over signal line 58 also enables the AND gate 118 to perform the comparator decoding function which identifies the term of the lock-out time interval.

The state of the circuit 50 remains as aforedescribed during the generation of the lock-out time interval by the timer circuit 64. Should a repeat decoding of the address function F1 occur during the lock-out time interval thereof, the corresponding pulse generated over the signal line F1 is inhibited from causing an alert annunciation and also from reinitiating the timer circuit 64 by the lock-out flip-flop 164. However, should another address function F2, F3, or F4 be decoded during the lock-out time interval, the pulsed signal generated in response to the decoding thereof is coupled over the appropriate signal line and to activate the corresponding lock-out circuit in the same manner as described for the lock-out circuit of flip-flop 4. Similarly, the timer circuit 64 is reinitiated in generating the lock-out time interval by a pulse signal over signal line 190. Concurrently therewith, the corresponding alert annunciation is activated by the corresponding inverter gate output of 150, 152, or 154 and thereafter, the appropriate output lines of the corresponding inverter gate 134, 136, or 138 are inhibited when the falling edge of the pulsed signal activates the corresponding flip-flop circuit. Thus, the lock-out time interval may be sequentially expanded in duration depending upon the number of different address function detects that occur during the generation thereof.

When the term of the lock-out time interval is detected by the AND gate 118 and a time-out signal is generated over signal line 70, all of the lock-out circuits are reset via the flip-flop circuit 72, OR gate 76, and signal line 80. In response, the reset flip-flops cause their outputs to return to their reset states which permit future alert annunciations to be effected by the corresponding function detect signals of F1-F4. In addition, the output of the OR gate 216 is reset to a binary low state which enables the out-of-range circuit to respond to the signal lines 30 and 94, in which case, the sync pulse timing signals generated over signal line 30 are used to initiate the timer circuit 64 via inverter gate 226, inverter gate 228, and OR gate 84 to generate the out-of-range or second time interval. As long as the particular pager receiver is within the radiation pattern of at least one transmitter in the paging network, sync words shall be decoded and sync pulse timing signals generated causing the timer circuit 64 to be periodically reinitiated and never reach term of the lock-out time interval which, for the present embodiment, is selected at approximately six minutes in the decoder 92. In the event that the pager receiver falls outside a radiation pattern and no sync pulses are generated, then the timer circuit 64 continues generation of the second time interval to term, i.e. until the decoder 92 senses the programmed binary code over the signal lines 90. At term, the decoder 92 generates an out-of-range time-out signal over signal line 94 which sets the out-of-range flip-flop 100 via inverter gate 224 and causes an out-of-range annunciation using the signal line 104.

As described in connection with the embodiment of FIG. 4, in the event that a lock-out function is not needed, a digital code represented by all binary one states may be programmed into the code plug 66 for the signal lines SL0-SL3. This special code is detected by the NAND gate 120, for example, to disable the decoding operations of the AND gate 118 and maintain the lock-out circuits in a reset state by the signal generated through the inverter gate 122 and OR gate 76 via signal line 80. Accordingly, until the binary code over signal lines SL0-SL3 is altered from the special code, the lock-out circuits will remain disabled.

The power reset signal over signal line 232 is used to reset the flip-flop 72 to effect desired binary states at its output 78 and 82 at power-up. Also, the battery saver reset signal over signal line 234 causes the inverter gate 236 to hold the outputs of the signal lines F1-F4 and 30 low except for predetermined periods of time during which signals are expected to be decoded and generated over such signal lines.

While the present invention has been described in connection with a particular embodiment as depicted in FIGS. 4 and 5, it is apparent that modifications and additions may be made to the embodiment without deviating from the broad principles of the present invention. In fact, other equivalent circuits, analog or digital, or a software program operating in a processor may be substituted to embody the present invention. Accordingly, the present invention should not be limited to any single embodiment, but rather construed in accordance with the recitation of the appended claims.

What is claimed is:

1. A pager receiver including a receiver for receiving transmitted RF signals and converting such signals to received signals for use within the paper receiver, decoder means for decoding the received signals in accordance with a coded paging system format which includes sync words and address function data to generate sync pulse timing signals in response to decoded sync words and to generate a function detect signal in response to a corresponding decoded address function of the pager receiver, means governed by said function detect signal to cause an alert annunciation corresponding to the decoded address function, and a source of timing signals, said pager receiver comprising:

means for inhibiting an alert annunciation in response to a repeat decoding of a corresponding address function within a first selected time interval of an initial decoding thereof;

means for detecting a lack of decoded sync words over a second selected time interval and for causing an out-of-range annunciation in response to said detection; and single timer means coupled to both of the inhibiting means and the detecting means and responsive to said timing signals for generating an initiated one of either the first or second selected time intervals;

said inhibiting means including lock-out means corresponding to each address function of the pager receiver, said lock-out means activated by the function detect signal generated in response to the initial decoding of the corresponding address function to initiate the generation of the first selected time interval by the single timer means and to inhibit an alert annunciation in response to subsequently generated corresponding function detect signals for the duration of the first selected time interval generated by the single timer means;

said detecting means including first means responsive to the sync pulse timing signals to initiate at each sync pulse timing signal the generation by the single timer means of the second selected time interval which is substantially longer in time than the time interval between any two successive sync pulse timing signals; second means for generating a set signal at the term of the second selected time interval generated by the single timer means, whereby no set signal is generated as long as sync pulse timing signals are generated; and third means responsive to said set signal for causing the out-of-range annunciation.

2. A pager receiver in accordance with claim 1 wherein the inhibiting means further includes means for disabling the detecting means from causing an out-of-range annunciation for the duration of an initiated first selected time interval.

3. A pager receiver in accordance with claim 1 wherein the inhibiting means includes means for disabling the first means from initiating the generation of the second selected time interval by the single timer means in response to sync pulse timing signals for the duration of an initiated first selected time interval.

4. A pager receiver in accordance with claim 1 having programmed therein a plurality of address functions, each corresponding to a different alert annunciation; and wherein the inhibiting means includes: a plurality of lock-out means respectively corresponding to the plurality of address functions, each lock-out means being activated by the initial function detect signal corresponding thereto; and means for reinitiating the single timer means during the generation of the first selected time interval by an activated lock-out means corresponding to an uninhibited alert annunciation.

5. A pager receiver in accordance with 1 wherein the single timer means comprises a digital divider network which generates a digitally coded word representing a duration of time from an initiation; including means for selecting a first digitally coded word representing the first selected time interval; and first decoder means for comparing the timer generated digitally coded word with the selected first digitally coded word to generate, when enabled, a signal indicative of term of the first selected time interval, said term signal governing the inhibiting means; and wherein said digital divider network is initiated by an activated lock-out means and said first decoding means is enabled by an activated lock-out means.

6. A pager receiver in accordance with claim 5 including second decoding means for detecting when the code of the generated digitally coded word of the single timer means is substantially equivalent to a selected code representative of the second selected time interval and for generating a signal indicative of said detection, said signal governing the detecting means.

7. A pager receiver in accordance with claim 1 wherein the single timer means is initiated to generate the second selected time interval by a sync pulse timing signal in the absence of an activated lock-out means.

8. A pager receiver in accordance with claim 1 wherein the pager receiver includes means for selecting a special digitally coded word; and a second decoder means responsive to said selected special digitally coded word to disable the inhibiting means from inhibiting an alert annunciation.

* * * * *